May 30, 1961     A. G. CARTER     2,986,181
BAND SAW GUIDE

Filed Sept. 3, 1957     2 Sheets-Sheet 1

INVENTOR.
ANDREW G. CARTER
BY
ATTORNEYS

May 30, 1961     A. G. CARTER     2,986,181
BAND SAW GUIDE
Filed Sept. 3, 1957     2 Sheets-Sheet 2
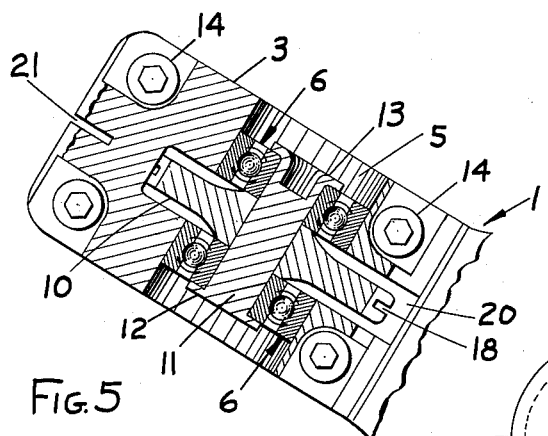
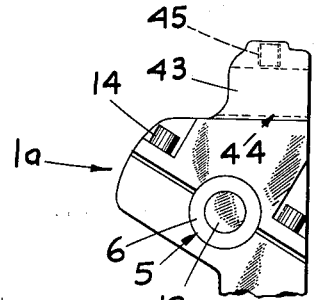
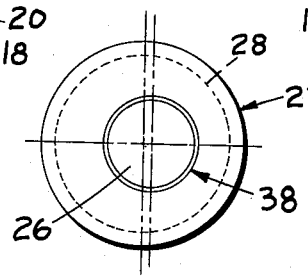
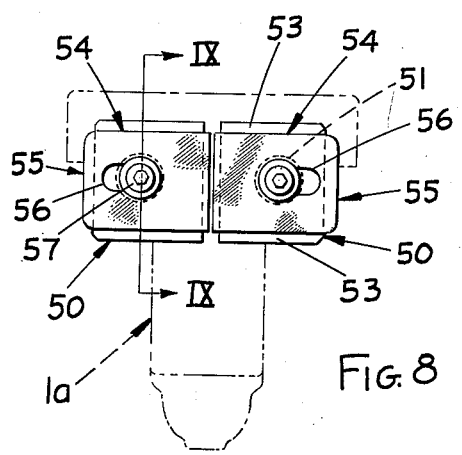
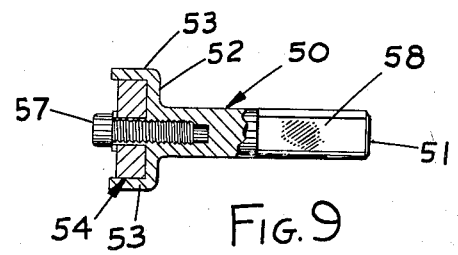
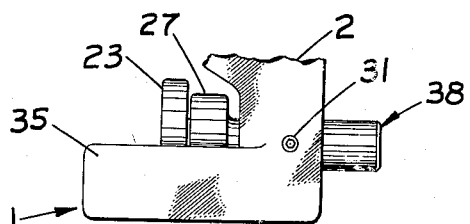
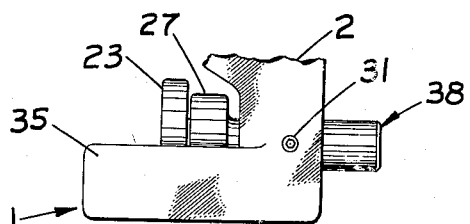
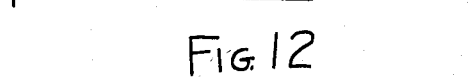
INVENTOR.
ANDREW G. CARTER
BY
ATTORNEYS

United States Patent Office 2,986,181
Patented May 30, 1961

2,986,181

BAND SAW GUIDE

Andrew G. Carter, 30 Ionia SW., Grand Rapids, Mich.

Filed Sept. 3, 1957, Ser. No. 681,627

2 Claims. (Cl. 143—162)

This invention relates to machinery and more particularly to the guides used on band saws to support the blade adjacent its contact with the work piece.

Band saw blades immediately above and below the table where they engage the work piece are normally supported at the back to prevent deflection due to thrust as materials are pushed against the blade. They are also guided on each side to prevent twisting and lateral deflection.

It has been conventional design to construct these guides with the blade contacting wheels supported by ball bearings. Since these guides must be limited in size for several reasons, including among others, elimination of obstruction to visibility, it has been conventional practice to mount the bearings in the hubs of the wheels. This causes the outer race of the bearing rather than its inner race to be rotated. Further, it has been conventional practice to so mount these wheels particularly the wheel contacting the back of the blade that the loads applied to the bearings were eccentric, producing substantial axial thrust rather than radial thrust. Conventional ball bearings have a relatively short life expectancy when subjected to axial thrust. Further, where the outer race rather than the inner race is rotated, the bearing may not be operated in excess of 60% of its rated capacity.

Due to the introduction of new materials, especially the super hard materials, it has been necessary to greatly increase the speed of band saw blades. Sometimes this is coupled with added pressure exerted against the backing wheel for the blade. Whereas conventional band saws are driven at a speed of 7,000 to 9,000 feet per minute it is now common to use speeds from 12,000 to 16,000 feet per minute. This has resulted in frequent failure of the blade guides due to overloading of the bearings. Only small diameter bearings can withstand the high speeds. However, small bearings have insufficient load ratings to stand the loads imposed. Further any form of axial or twisting load greatly accelerates the failure of the bearings.

This invention overcomes this difficulty by providing a wholly new bearing structure for the guide wheels, designed to use bearings under the most efficient operating conditions and under such circumstances that the loads imposed on the bearing are well within its rated capacity. This invention provides the first durable blade guide for the new, high speed, high performance band saws.

These and other objects and purposes of this invention will be understood by those acquainted with the design and construction of band saws upon reading the following specification and the accompanying drawings.

In the drawings:

Fig. 5 is a fragmentary sectional view taken along the plane V—V of Figure 4.

Fig. 6 is a fragmentary side elevation view of the bearing housing modified for mounting beneath the saw table.

Fig. 7 is a rear elevation view of one of the bearing supports for the side guide wheels.

Fig. 8 is a front elevation view of the guide equipped with wiping blocks for guiding the blade.

Fig. 9 is a partially sectional view taken along the plane IX—IX of Fig. 8.

Fig. 10 is a rear elevation view of the structure illustrated in Fig. 9.

Fig. 12 is a fragmentary side elevation view of the lower portion of the guide.

Executing the objects and purposes of this invention there is provided a band saw guide having a backing wheel for the blade. The backing wheel is supported on each side by ball bearings with the shaft of the wheel mounted through the center of the bearing. The guide also provides a pair of side guide wheels each of which has a spindle mounted in the center of a ball bearing. Each of these ball bearing assemblies is press fitted into a cup. The cup is eccentrically mounted on the end of a shaft. Rotation of the shaft adjusts the lateral position of the guide wheel with respect to the blade. This regulates its contact with the blade and its position in relation to the central backing wheel. The whole guide is mounted on an offset post. The post is axially adjustable with respect to the frame of the band saw whereby the entire guide may be moved toward or away from the blade for positioning it correctly with respect to the depth of the blade being used. By reason of the offset in the post, the guide's lateral position may be varied to align with the blade.

Referring specifically to the drawings, the numerals 1 and 1a refer to upper and lower guides respectively. The only difference between the upper and lower guides 1 and 1a is a slight modification of the structure of the guide housing for the purpose of facilitating its mounting to the frame of the band saw. The details of this difference will be discussed subsequently.

Figure 4:
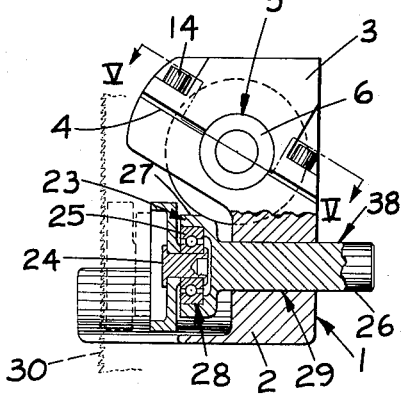
Fig. 4 is a sectional elevation view taken along the plane IV—IV of Figure 2.

The housing 1 consists of a base portion 2 and a head portion 3 separated along an inclined joint (Fig. 4). The inclined joint 4 runs through the center of a bearing seat 5. The bearing seat 5 is circular and has seated within it a pair of ball bearing assemblies 6, one adjacent each side of the housing.

The ball bearing assemblies 6 are part of a sub-assembly including a backing wheel 10 mounted on a shaft 11 (Fig. 5). The backing wheel 10 has a peripheral blade groove 18. The backing wheel 10 is fixedly secured to the shaft 11 so that the two rotate together. One of the ball bearing assemblies 6 is mounted on each side of the backing wheel with the shaft 11 passing through the inner races of the bearings (Fig. 5). The shaft 11 has a head 12 on one end and a flange 13 on the other end. The flange 13 is formed by upsetting or coining over the end of the shaft to form a permanent assembly. The bearings 6 are securely locked to the housing 1 by the clamping pressure exerted by the stud bolts 14. These secure the head portion 3 to the base portion 2. If desired, thin spacers may be used in the gap at the joint 4 to prevent excessive closing pressure on the bearings 6.

Figure 2:
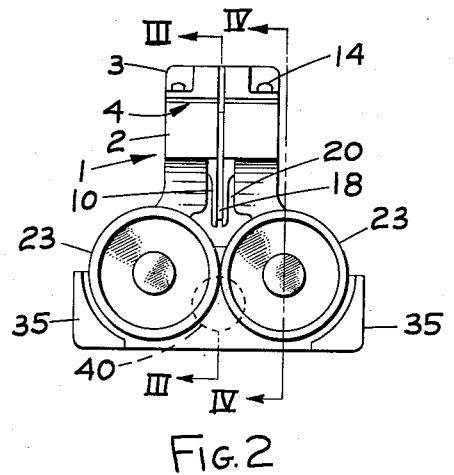
Fig. 2 is a front elevation view of an upper guide incorporating this invention.
Figure 3:
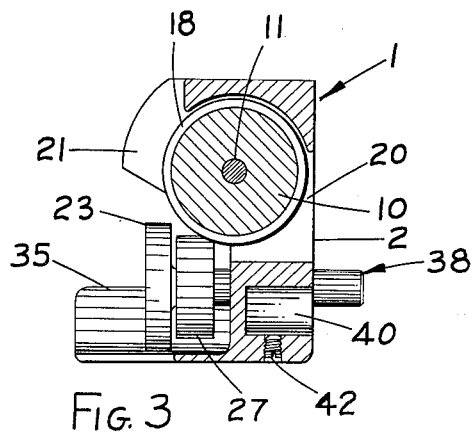
Fig. 3 is a sectional elevation view taken along the plane III—III of Figure 2.

A central slot 20 is formed in the housing (Figs. 2 and 3). This slot 20 extends into both the base and head portions. The slot 20 forms a pocket or recess for the backing wheel 10. The forward portion of the slot is somewhat narrower than the rear portion and provides blade channel 21 through the housing affording blade access to the backing wheel 10 (Fig. 3).

Below the backing wheel 10, the housing is recessed forming a pocket for seating the guide wheels 23 (Fig. 4). Each guide wheel 23 has a broad peripheral flange, smoothly ground to precise dimensions to eliminate any radial eccentricity. This is important because this flange contacts the blade and, as it rotates, it must neither withdraw from the blade nor pinch it. Mounted through the center of each guide wheel is a headed stud shaft 24. The stud shafts each extend through the inner race of a ball bearing assembly 25. Their inner ends are flanged or coined over to permanently assemble the guide wheels to the bearing assemblies 25.

Each guide wheel 23 is independently supported on an arbor 38. The arbors 38 each consist of a shaft 26 having a cup shaped head 27 on one end. The center of the shaft 26 is eccentric of the center of the cup shaped head 27, as indicated in Figure 7. The head has a forwardly opening recess 28. The recess 28 is concentric of the head and, therefore, eccentric of the shaft 26. The bearing supporting the guide wheel 23 is press-fitted into the recess 28, making the guide wheel 23 eccentric of the shaft 26.

The base portion 2 of the housing 1 has a pair of spaced openings 29. Each opening receives one of the shafts 26. These openings are so spaced that the guide wheels 23 will be supported one on each side of the band saw blade 30 and spaced longitudinally of the blade 30 a short distance from the backing wheel 10. Suitable means such as the set screws 31 (Fig. 12) are provided for locking the shafts 26 to the housing. Other conventional locking means may be substituted for the set screws. The length of the shaft 26 is such that the guide wheels may be moved inwardly or outwardly with respect to the housing as required to position them properly with relation to the particular width of band saw blade being used.

Extending outwardly from the housing adjacent each of the guide wheels 23 is a guard flange 35 (Figs. 2 and 12). The guard flange is of sufficient length to prevent a work piece from contacting the guide wheels 23.

Figure 11:
Fig. 11 (Sheet 1) is a side elevation view of the guide mounting post.

The base portion 2 of the housing 1 for guides used above the saw platform 60 has a blind pocket 40 for reception of the end of the supporting post 41 (Fig. 3). The post is locked to the housing by suitable means such as the set screw 42. The post 41 is offset for purposes which will appear more fully under operation (Fig. 11). Where the guide is to be used below the saw platform it is inverted and on the head portion 3 has an upstanding block 43 equipped with an opening 44 (Fig. 6). The opening 44 serves the same purpose as the blind pocket 40, that is, to receive one end of a mounting post 41. As in the case of the pocket 42 the post is secured to the housing by suitable means such as a set screw 45. In guides employing the block 43, the bind pocket 40 may be omitted.

In some cases, it is desirable to provide wiping blocks rather than guide wheels for side contact with the blade. Such wiping blocks serve to remove material which accumulates on the blade as it passes through the work piece. This is particularly true of materials which tend to varnish or otherwise coat the blade. This invention equipped with wiping blocks is illustrated in Figures 8, 9, and 10. In this case an arbor 50 is provided having a shaft portion 51 and a head portion 52. The head portion 52 has a pair of outwardly projecting, parallel flanges 53 defining a channel 54. Seated in the channel is a wiping block 55 of such cross sectional dimensions that it is positively held in the channel against any possible twisting. Each wiping block has an elongated slot 56. Extending through the slot is a cap screw 57 engaging a central opening in the arbor 50. The slot 56 permits the wiping blocks 55 to be moved horizontally on the arbor to effect a sliding but not binding fit against the saw blade.

Since the wiping blocks 55 are horizontally adjustable, it is unnecessary that the arbor 50 be designed to provide this adjustment. Accordingly, the shaft portion 51 is provided with a flattened area 58 so that the tightening of the set screw in the housing automatically causes the support to position the channel 54 normal to the sides of the saw blade. This automatically aligns the contacting faces of the wiping block parallel to the body of the saw blade.

*Operation*

The purpose of this invention is to provide a guide for a band saw blade which will support and guide the blade both at the back and on each side. To properly and accurately guide the blade, the backing wheel 10 and the guide wheels 23 must be accurately aligned with the blade and so positioned that they make precisely the correct contact with it. In previous constructions the backing wheel has been adjustable with respect to the housing so that it may be moved into contact with the back of the blade. In the present construction, the backing wheel is fixed to the housing and the entire housing is moved to bring the backing wheel 10 into contact with the blade 30. This is done by releasing the support post 41 from the frame of the band saw so that it may be moved up to the blade.

If the slot 18 in the backing wheel is not aligned with the blade, the housing may be adjusted laterally to correct the situation. This is done by turning the support post 41. By reason of the offset in the post, its rotation effects a limited range of lateral travel. Once the housing has been properly aligned laterally and vertically with the blade 30, it is located in position. This may be done by tightening a set screw in the band saw housing to fix the position of the supporting post 41.

The guide wheels 23 are repositioned to make proper contact with the band saw blade 30. To do this, their arbors are released by loosening the set screws 31 which lock their shafts 26 to the housing. The released arbors are adjusted axially to position the guide wheels 23 immediately back of the teeth of the blade 30. The arbors also are rotated so that the guide wheels make light but positive contact with the blade. This firmly supports the blade against lateral twisting or bending. The rotation of the arbors 38 adjusts the guide wheels 23 laterally by reason of the eccentricity of the guide wheels with respect to the axes of the shaft portions 26.

Figure 1:
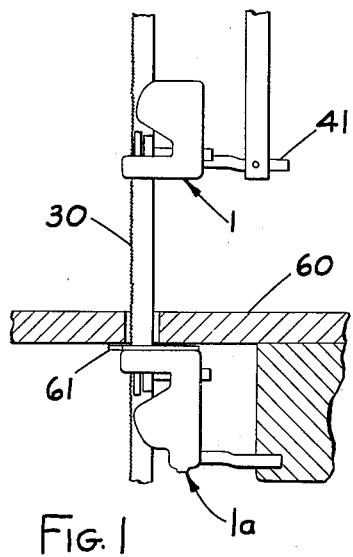
Fig. 1 is a fragmentary view of a band saw blade supported by a pair of guides incorporating this invention.

The mounting of the guide 1a below the platform 60 is the same as that of the guide 1 above except that it is inverted with the guide wheels 23 adjacent the platform and the backing wheel 10 below. In certain cases, a dust shield 61 (Fig. 1) may be mounted on the upper surface of the lower guide to protect the guide from the cuttings created by the saw.

The forces exerted by the saw against the backing wheel 10 are absorbed by the bearings 6 as radial thrust since this wheel is supported on each side by a bearing and no twisting or eccentric loads are generated. This permits the bearings to be used at maximum rating. Since the inner race is rotated and the outer race is stationary each of the bearings 6 may be operated at maximum rated capacity. The same is true of the bearings 25 supporting the guide wheels 23. The use of two bearings to support the backing wheel 10 doubles the capacity of the backing wheel. Further it permits smaller bearings to be used while still meeting the requirements of bearing strength in radial thrust at the high operating speeds requested. This is particularly essential at high speeds because only small bearings can be employed and withstand the required angular velocity.

The side thrust applied to the guide wheels 23 is relatively small. Therefore, the fact that there is slight eccentricity in the application of the loads to the bearings 25 is relatively immaterial. It is important, however, that the structure utilizes the inner race as the rotating member, thus, permitting the bearings to develop their maximum rating. These features provide a durable guide capable of withstanding the high speeds and pressures attendant the cutting of certain recently developed super hard materials. This invention has solved a problem which has practically rendered band saws useless with such materials.

While I have described a preferred embodiment of my invention, it will be recognized that modifications of this invention may be made. Such of these modifications as incorporate the principle of the invention are to be considered as included in the hereinafter appended claims unless these claims by their language expressly state otherwise.

I claim:

1. A guide for a band saw blade, said guide having a body; a rotatable backing wheel for said blade adapted to engage an edge of the blade; a shaft, said backing wheel being fixedly mounted on said shaft with said shaft projecting from said backing wheel on each side thereof; a pair of bearing means supporting said shaft, one on each side of and closely adjacent said backing wheel; said bearing means being rigidly secured to said housing; a pair of guide wheels each adapted to engage an opposite face of said blade; said guide wheels each having a central stud shaft extending from one side thereof; a pair of bearing arbors; each of said bearing arbors having a cup shaped head and a circular mounting post; each of said posts rotatably and slidably engaging said housing; means for locking each of said posts to said housing against rotation and sliding travel; said heads of said bearing arbors being eccentric of said posts whereby the spacing between said bearing arbors may be adjusted by rotation thereof; a radial bearing press-fitted in each of said recesses; each of said stud shafts being rotatably mounted in one of said radial bearings.

2. A guide for a band saw blade, said guide having a body; a rotatable backing wheel for said blade adapted to engage an edge of said blade; means rotatably mounting said backing wheel on said housing; a pair of guide wheels each adapted to engage an opposite face of said blade; said guide wheels each having a central stud shaft extending from one side thereof; a pair of bearing arbors; each of said bearing arbors having a cup shaped head and a circular mounting post; each of said posts rotatably and slidably engaging said housing; means for locking each of said posts to said housing against rotation and sliding travel; said heads of said bearing arbors being eccentric of said posts whereby the spacing between said bearing arbors may be adjusted by rotation thereof; a radial bearing press-fitted in each of said recesses; each of said stud shafts being rotatably mounted in one of said radial bearings.

References Cited in the file of this patent

UNITED STATES PATENTS

| | | |
|---|---|---|
| 144,797 | Roche et al. | Nov. 18, 1893 |
| 535,383 | Long | Mar. 12, 1895 |
| 758,619 | Culpepper | May 3, 1904 |
| 843,097 | Rathke | Feb. 5, 1907 |
| 1,069,032 | Roick | July 29, 1913 |
| 1,415,386 | Paddock | May 9, 1922 |
| 1,429,606 | Marsland | Sept. 19, 1922 |
| 1,760,577 | Bishop | May 27, 1930 |
| 2,210,185 | Storz | Aug. 6, 1940 |
| 2,311,426 | Wilkie | Feb. 16, 1943 |
| 2,333,867 | Kucko | Nov. 9, 1943 |
| 2,695,637 | Ocenasek | Nov. 30, 1954 |

FOREIGN PATENTS

| | | |
|---|---|---|
| 56,029 | Norway | Dec. 2, 1940 |
| 14,739 | Denmark | June 26, 1911 |